M. T. K. ROSENOW.
TIRE PROTECTOR.
APPLICATION FILED DEC. 17, 1912.
1,102,084.
Patented June 30, 1914.
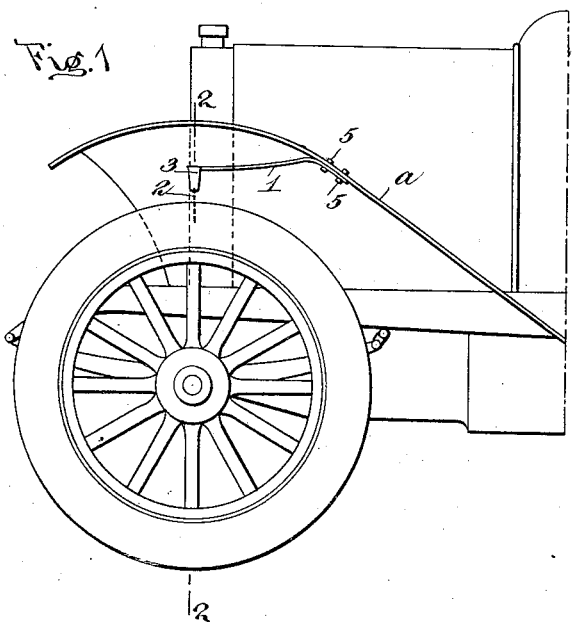
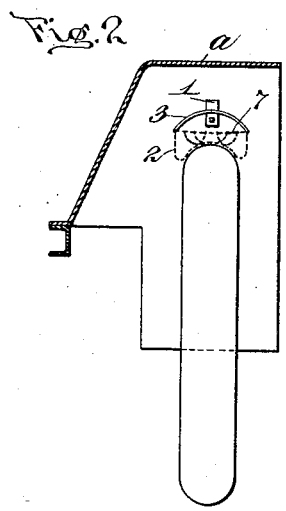
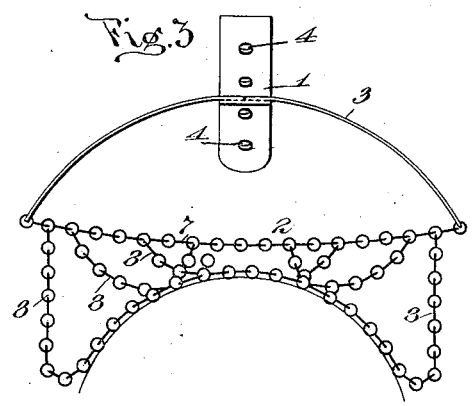
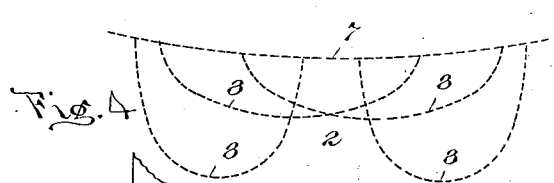
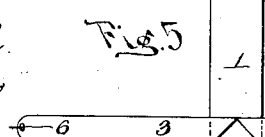
Witnesses:
Inventor
Max Theodor Karl Rosenow
By Dyer Dyer & Taylor
Attorneys.

UNITED STATES PATENT OFFICE.

MAX THEODOR KARL ROSENOW, OF METUCHEN, NEW JERSEY.

TIRE-PROTECTOR.

1,102,084.　　　　　Specification of Letters Patent.　　Patented June 30, 1914.

Application filed December 17, 1912. Serial No. 737,196.

*To all whom it may concern:*

Be it known that I, MAX THEODOR KARL ROSENOW, a subject of the Emperor of Germany, and residing at Metuchen, county of Middlesex, State of New Jersey, have invented a certain new and useful Tire-Protector, of which the following is a specification.

This invention relates to protectors for tires, of rubber or similar character, such as pneumatic, cushion or solid.

The objects are to remove tacks, nails, glass or other objects or substances which may become attached to the tire, and which, if not removed, will penetrate or cut the latter and otherwise injure it.

Most obstructions, such as sticks, stones, or glass, are picked up by the tire, and do not seriously injure the latter for some time,—sometimes, as much as a half hour, when, by continuous contact with the ground, they are driven into the tire.

One of the objects of my invention is to remove such obstructions before they injure the tire and before they have an opportunity to enter the latter. In the event that an obstruction becomes quickly inserted in the tire, so that it is not removed by means of my device, the latter will act as a signal or alarm to notify the occupants of the vehicle that the obstruction exists, so that the vehicle may be stopped and the obstruction withdrawn, either by hand or a suitable tool.

A further object is to keep the tire clean, and free from dirt, mud, etc.

These objects are attained by a device which is cheap and durable, easily attached, capable of use with different designs and sizes of wheels, tires and vehicles, and which will be noiseless under normal conditions.

These and further objects will more fully appear from the following specification and accompanying drawings, considered together or separately.

In the drawings, Figure 1 is a side elevation of a portion of an automobile, showing a device embodying the invention in place; Fig. 2 is a sectional view of the latter, taken on the line 2—2 of Fig. 1; Fig. 3 is an enlarged front elevation; Fig. 4 is a diagrammatic view of one arrangement of the chain; and Fig. 5 is a plan view of a device embodying the invention.

In all of the views, like parts are designated by the same reference characters.

I will describe my invention in connection with one embodiment suitable for use upon the standard automobile, employing pneumatic tires. The details are modified according to the character of the automobile, and the size of the tires, but the device illustrated in the drawings and hereinafter described, can be employed with most types of standard pleasure and commercial automobiles and horse drawn vehicles employing pneumatic, solid or cushion rubber tires.

One device is applied to each wheel. The device, in the embodiment chosen for illustration, consists of a frame or support 1, and a flexible engaging member 2, in contact with the tire. The support 1 is preferably made of metal, specifically sheet steel, of sufficient flexibility to be bent to the proper shape to accommodate different styles of mud guard, and of sufficient stiffness to remain in shape. This support is provided with a cross-head 3, to which the member 2 is attached. The head is preferably made as follows, and as shown in Fig. 5. The support is made of a strip of sheet metal of suitable length, width and thickness. One end is split for a distance equal to about half the length of the cross-head, thus producing a fork. The tines of the fork are then folded at right angles, and creased at the joint, along an angle, as shown. The parts may be further strengthened by welding or soldering, but this is not ordinarily necessary. The support is attached to the mud guard $a$, or any other part of the vehicle, in any suitable manner. The specific means comprises holes 4, 4, etc., near one end of the support, through which bolts, 5, 5, and lock nuts pass. These bolts also pass through the mud guard. I show four holes, with two bolts, thus allowing sufficient latitude for attachment to any ordinary shape of mud guard. The support is preferably attached so that it is at right angles to the axle of the wheel, although this is not absolutely necessary.

The ends of the cross-head have holes 6, 6, for attachment of the flexible engaging means 2. These latter means rest upon the tire, but are guided and held in proper position by the support 1. I show the flexible engaging means as formed of chains. These are preferably made of steel of good quality, so as to be light and at the same time strong, and also capable of resisting wear. The chain loosely engages the top and sides of the tire. It is preferably made in several pieces, looped, so that the bights will rest upon different portions of the tire. Fig. 4 represents the preferred arrangement. A length of chain 7, extends from end to end of the cross-head, being secured to the holes 6, 6. This length of chain does not ordinarily come into contact with the tire. To this chain are attached loops of chain, 8, 8, which are of different lengths, so that the bights thereof will rest upon and be supported upon the tire. The loops at the center are shorter than those at the side, to accommodate the curve of the tire, so that all parts of the wearing surface of the tire will be engaged by one or more loops. The points of connection of the loops 8, 8, to the chain 7, are staggered, or overlapped as shown, so that their points of separation are farther apart than if this construction were not used. These chains brush lightly against the tire, and do not appreciably cause wear. They remove all dirt and mud, but, owing to the vibration of the chains, caused by movement of the vehicle and vibration of the wheel, all dirt and mud is shaken clear of the chains and they, therefore, do not accumulate dirt or mud. Any obstructions, such as pieces of glass, tacks, nails or the like, which may be picked up by the tire, will come into contact with the chains and will be removed by the latter before serious injury is caused to the tire. Any cuts or openings in the tires, which would otherwise pick up stones or dirt, to the injury of the tire, will be cleared by the chains. If a nail, or other obstruction, becomes embedded in the tire so deeply that the chains will not remove it, the latter, coming in contact with it during each revolution of the wheel, will make such a noise that the occupants of the vehicle will have their attention directed to it, and will then be able to stop and remove the obstruction before it does serious damage. The longitudinal member 1 and cross-head 3 form an elastic support for the chains so that the jolting and springing of the car will cause the support to vibrate and yield elastically independent of the movement of the car, thus adding to the efficiency and durability of the device.

I have found in practice that my device greatly increases the length of the life of pneumatic tires on automobiles. By actual experience, I find that the life of the shoe is increased for fifteen hundred miles or longer.

The device does not add to the resistance of the vehicle, and can be relied upon to pick up and receive most obstructions before they have become seriously embedded in the tire, usually after one or two revolutions of the wheel. My device is very much better than stiff and unyielding devices which seek to remove all obstructions the moment they come into contact with it. Such devices do not accommodate themselves to changes in contour of the tire, nor do they accommodate themselves to nails and other obstructions which become embedded in the tire at the first contact, and which are, therefore, not removed without seriously injuring the tire, or which destroy or break the protector.

Having now described my invention, what I claim as new and desire to secure by Letters Patent, is:—

1. A tire protector wherein are combined an elastic support attached to the car above the tire and normally out of contact therewith, such support being adapted to yield elastically independent of the movement of the car, and a light reticulated member depending from such support and loosely engaging the tire, substantially as set forth.

2. A tire protector wherein are combined a support suspended above the tire and including a cross head, a chain connecting the ends of the cross head and extending across the tire normally out of contact therewith, and a plurality of chains depending in loops from such cross chain and having their bights loosely engaging the tire, substantially as set forth.

3. A tire protector wherein are combined a support above the tire, and a series of chain loops, certain of the loops being located entirely on either side of the tire, and loops which cross the tire, said loops depending from the support and having their bights loosely engaging the tire, substantially as set forth.

4. The combination, in an automobile, with the wheel and mudguard, of a support formed of a strip of elastic sheet metal attached to the lower side of the mudguard above the wheel and extending longitudinally in relation to the automobile, said support being out of contact with the wheel, there being a cross-head on the support at right angles thereto, and loops of chain carried by the cross-head and bearing upon the wheel.

This specification signed and witnessed this thirteenth day of December, 1912.

MAX THEODOR KARL ROSENOW.

Witnesses:
 GENYET BALZ,
 LEONARD HUNTRESS, Jr.